United States Patent
Latal et al.

[11] Patent Number: 5,868,537
[45] Date of Patent: Feb. 9, 1999

[54] SPONGE HEAD RETAINER PIN

[75] Inventors: James F. Latal, Palatine; Paul J. Dorn, Elk Grove Village, both of Ill.

[73] Assignee: Illinois Tool Works Inc., Glenview, Ill.

[21] Appl. No.: 86,629

[22] Filed: May 29, 1998

[51] Int. Cl.[6] ............................ F16B 21/00; F16B 35/04
[52] U.S. Cl. ......................... 411/418; 411/437; 411/510; 411/553
[58] Field of Search ..................... 411/409, 437, 411/509, 510, 551, 552, 553, 418, 420

[56] References Cited

U.S. PATENT DOCUMENTS

| | | | |
|---|---|---|---|
| 2,730,154 | 1/1956 | Aspey | 411/553 X |
| 4,430,035 | 2/1984 | Rodseth | 411/409 X |
| 4,728,238 | 3/1988 | Chisholm et al. | 411/510 |
| 4,900,210 | 2/1990 | Buchanan et al. | 411/510 X |
| 5,306,098 | 4/1994 | Lewis | 411/510 |

FOREIGN PATENT DOCUMENTS 9006449  6/1990  WIPO ..................... 411/553

*Primary Examiner*—Neill Wilson
*Attorney, Agent, or Firm*—Kane, Dalsimer, Sullivan, Kurucz, Levy, Eisele and Richard, LLP

[57] ABSTRACT

The retainer pin includes a plurality of longitudinal rows of radially extending wings about a circumference of a shank. The radially extending wings within any one row are longitudinally offset from longitudinally adjacent wings by a pitch. The wings of circumferentially adjacent rows are offset by a distance equal to one half of the pitch thereby forming a double helix. The double helix configuration of the radially extending wings creates a screw-like configuration which is used to engage a partially threaded aperture.

16 Claims, 2 Drawing Sheets

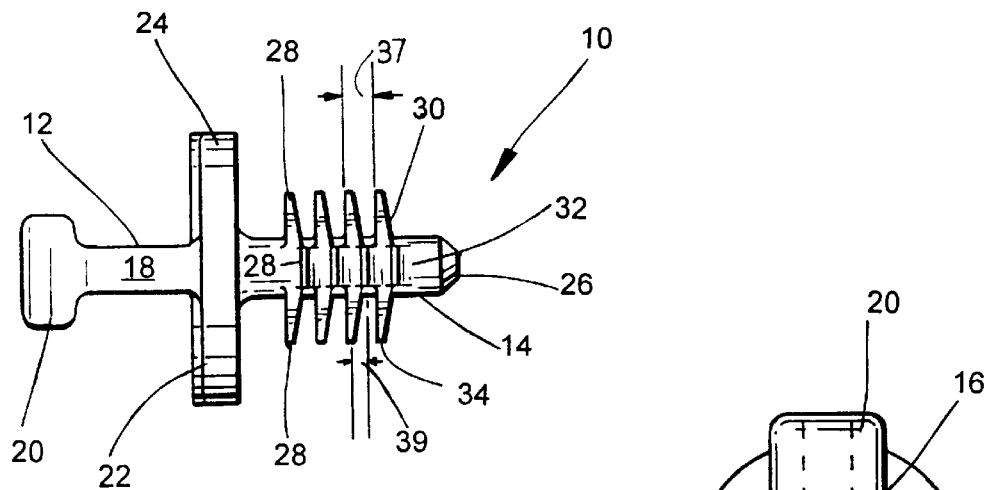
FIG. 1
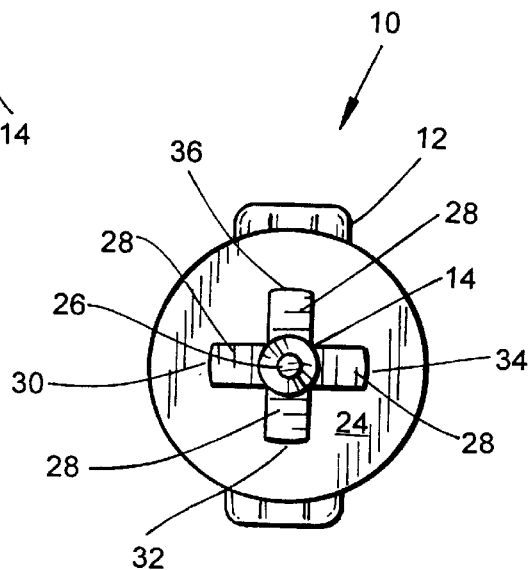
FIG. 3
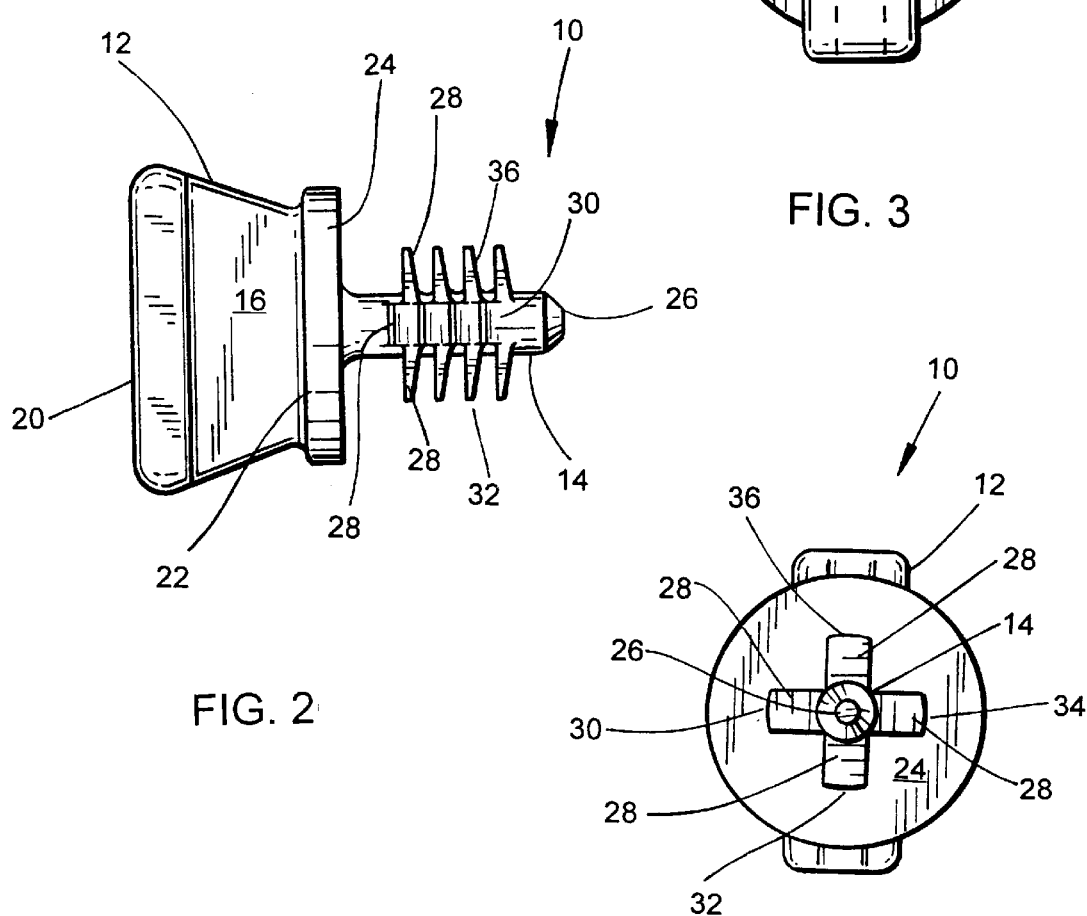
FIG. 2
FIG. 4

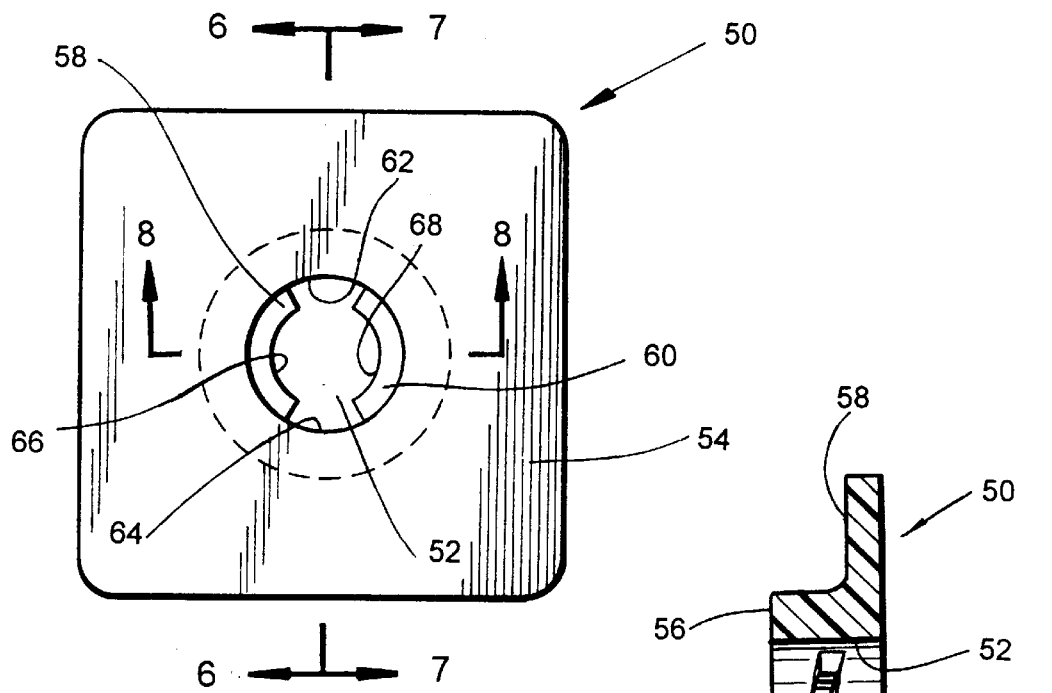
FIG. 5
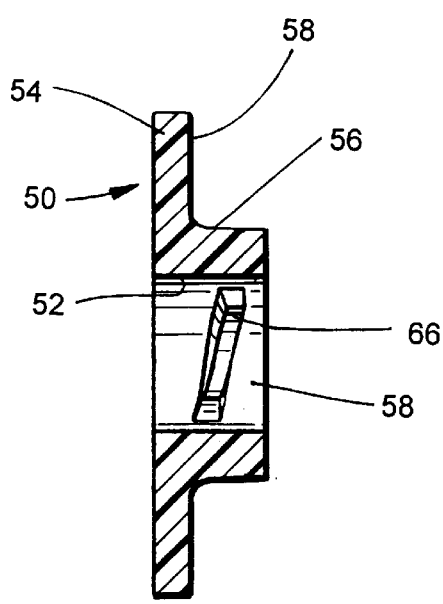
FIG. 6
FIG. 7
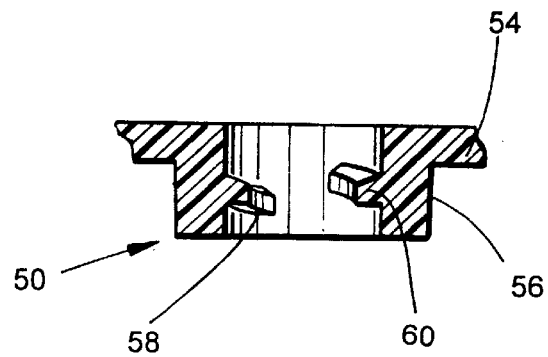
FIG. 8 es description and claims,

SPONGE HEAD RETAINER PIN

BACKGROUND OF INVENTION

1. Field of Invention

This invention pertains to a retainer pin for a sponge head or similar applications. The retainer pin includes rows of longitudinally offset wings which form a double helix configuration to engage a partially threaded complementary aperture.

2. Description of the Prior Art

In the prior art, it is known to use conventional metal screws as retainer pins. However, this is unsatisfactory in such applications as attaching sponge cartridges to a mop base due to the potential corrosion of the metal screws.

Plastic or similar materials have been used in drive fasteners, such as is disclosed in U.S. Pat. No. 3,810,279 entitled "Plastic Drive Fastener" issued on May 14, 1974 to Swick et al. However, such a drive fastener does not appear to offer any ability to repeatedly engage and disengage, such as can be done with a threaded member, such as a screw.

Moreover, in sponge head applications, any retainer pin must be simple to use, with removability that is simple to recognize without the need for instructions or tools. It is also important that a retainer pin in a sponge head application be compatible with sponge heads common in the market.

OBJECTS AND SUMMARY OF THE INVENTION

It is therefore an object of this invention to provide a retainer pin which can be repeated engaged and disengaged.

It is therefore a further object of this invention to provide a retainer pin which can be used by a consumer with a minimum of instructions.

It is therefore a further object of this invention to provide a retainer pin which can be engaged and disengaged by a consumer with minimal or no tools.

It is therefore a still further object of this invention to provide a retainer pin which does not corrode, particularly in sponge head applications.

It is therefore a still further object of this invention to provide a retainer pin which is compatible with products currently on the market, particularly sponge heads.

These and other objects are attained by a retainer pin which is made from plastic or a similar material. The head of the retainer pin includes a broad gripping portion adapted to a user's thumb and forefingers. The shank of the retainer pin includes a plurality of rows of prongs or wings. Each row of prongs or wings is longitudinally offset from an adjacent row of prongs or wings so as to create a double helix-type configuration which screwingly engages a partially threaded aperture. In the configuration with four rows of prongs or wings, each row of prongs or wings is longitudinally offset from an adjacent row by one half of the pitch between prongs or wings within the same row.

BRIEF DESCRIPTION OF THE DRAWINGS

Further objects and advantages of the invention will become apparent from the following description and claims, and from the accompanying drawings, wherein:

FIG. 1 is a side plan view of the retainer pin of the present invention, showing the edge of the head.

FIG. 2 is a side plan view of the retainer pin of the present invention, showing the face of the head.

FIG. 3 is a top view, partially in phantom, of the retainer pin of the present invention.

FIG. 4 is a bottom view of the retainer pin of the present invention.

FIG. 5 is a top view, partially in phantom, of a boss for use with the retainer pin of the present invention.

FIG. 6 is a cross-sectional view along section 6—6 of FIG. 5 the boss for use with the retainer pin of the present invention.

FIG. 7 is a cross-sectional view along section 7—7 of FIG. 5 of the boss for use with the retainer pin of the present invention.

FIG. 8 is a cross-sectional view along section 8—8 of FIG. 5 of the boss for use with the retainer pin of the present invention.

DETAILED DESCRIPTION OF THE PREFERRED EMBODIMENT

Referring now to the drawings wherein like numerals refer to like elements throughout the several views, one sees that FIGS. 1 and 2 are side views of the retainer pin 10 of the present invention. Retainer pin 10 is a single integral piece, typically manufactured from nylon or similar plastic material. Retainer pin 10 includes head 12 and shank 14. The edge 18 of head 12 is shown in FIG. 1 while the planar face 16 of head 12 is shown in FIG. 2. As shown in FIG. 1, the distal end 20 of head 12 is enlarged in order to allow the user to grip firmly the planar face 16 of head 12. The proximal end 22 of head 12 includes cylindrical disk element 24 coaxial with shank 14 which forms a bearing surface both for the user to push against while gripping the planar face and to provide a stop for the shank 14 as it passes through an aperture (see FIGS. 5–8).

Shank 14 has a generally circular cross section as illustrated in FIG. 4 with a tip 26 of reduced diameter. Shank 14 includes radially extending wings 28 arranged in four longitudinal rows 30, 32, 34, 36 which are spaced about the circumference or periphery of shank 14. Longitudinally adjacent radially extending wings 28 within the same row are spaced by pitch 37. As can be seen in FIGS. 1 and 2, circumferentially adjacent longitudinal rows of radially extending wings 28 are longitudinally offset from each other by distance 39 which is equal to one half of the pitch 37 between longitudinally adjacent (that is, within the same row) radially extending wings 28. This can be seen in FIG. 1 in that rows 30 and 34 have wings 28 which are directly radially across from each other while row 32 has wings which are offset from wings 28 of rows 30 and 34 by distance 39 which is equal to one half of the pitch 37 between adjacent wings within the same row. This is equally illustrated in FIG. 2 with rows 30, 32, 36. This staggering of rows 30, 32, 34, 36 provides for a double helix-like or screw-like characteristic to engage a threaded aperture, such as is found on standard sponge heads on the market.

Boss 50 is shown in FIGS. 5–8. Boss 50 is a nut-like configuration for engaging retainer pin 10 and includes partially threaded aperture 52 which is typical of an aperture to be engaged by retainer pin 10. Boss 50 is typically made of acetel copolymer or similar plastic. Boss 50 includes a planar body 54 of generally square shape with partially threaded aperture 52 formed at the center thereof. Circumferential wall 56 extends from the bottom surface 58 of planar body 54 to form aperture 52 and to provide an enlarged surface for thread segments 58, 60. Thread segments 58, 60 typically each span 120° of the circumference of aperture 52 with gaps 62, 64 of 60° therebetween. Thread segments 58, 60 typically have a 12.8° pitch. For instance, with a 0.175 inch diameter between the interior surfaces 66, 68 of thread segments 58, 60, respectively, resulting in a 0.550 inch circumference, a pitch of 12.8° would result in a rise of 0.125 inches in 360°, or 0.041 inches within the 120° span of thread segment 58 or 60. Typically, aperture 52 would have a diameter of 0.255 inches as measured within circumferential wall 56 which would define a limit of the tip-to-tip distance between the wings 28 of opposed pairs of rows 30, 34 and 32, 36. This configuration is compatible with the double helix configuration of retainer pin 10.

To use retainer pin 10 and boss 50, the user inserts retainer pin 10 into aperture 52 so that one opposed pair of rows 30, 34 or 32, 36 of wings 28 abuts thread segments 58, 60. The user then rotates retainer pin 10 so that the double helix formed by the offsetting of adjacent rows of wings 28 creates a screwing action so that retainer pin 10 screwingly engages aperture 52. Variations include aperture 52 being formed in devices other than boss 50 (for example, directly on a sponge head for a mop 'not shown'), and other planar devices (not shown) including a female element and being engaged between retainer pin 10 and boss 50 with retainer pin 10 acting as a male element and passing through the female element.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A retainer pin including:

a shank and a head;

said head providing a gripping surface; and said shank being integral with said head and including a plurality of longitudinal rows of radially extending wings about a periphery of said shank, wherein longitudinally adjacent wings are separated from each other by a pitch, and wherein peripherally adjacent longitudinal rows are longitudinally offset from each other by a distance, said distance being equal to one half of said pitch, said radially extending wings thereby forming a helix, said helix being adapted to screwingly engage an at least partially threaded aperture.

2. The retainer pin of claim 1 wherein said plurality of longitudinal rows is an even number of longitudinal rows.

3. The retainer pin of claim 2 wherein said even number is four.

4. The retainer pin of claim 3 wherein said shank is generally cylindrical with a tip of reduced diameter.

5. The retainer pin of claim 4 wherein said gripping surface includes a planar surface.

6. The retainer pin of claim 5 wherein said head includes an enlarged surface at a distal end thereof and a cylindrical disk at a proximal end thereof coaxial with said shank.

7. The retainer pin of claim 6 wherein the retainer pin is a single integral piece formed of plastic.

8. An attaching device comprising:

a male element and a female element;

said male element comprising a retainer pin including, a shank and a head;

said head providing a gripping surface;

said shank being integral with said head and including a plurality of longitudinal rows of radially extending wings about a periphery of said shank, wherein longitudinally adjacent wings are separated from each other by a pitch, and wherein peripherally adjacent longitudinal rows are longitudinally offset from each other by a distance, said distance being equal to one half of said pitch, said radially extending wings thereby forming a helix;

said female element comprising a surface with a threaded aperture therein, wherein said helix screwingly engages said female element.

9. The attaching device of claim 8 wherein said threaded aperture includes thread segments about a portion of an interior circumference thereof.

10. The attaching device of claim 9 wherein said thread segments comprise two thread segments each spanning 120° of said interior circumference with 60° therebetween.

11. The attaching device of claim 10 wherein said plurality of longitudinal rows is an even number of longitudinal rows.

12. The attaching device of claim 11 wherein said even number is four.

13. The attaching device of claim 12 wherein said shank is generally cylindrical with a tip of reduced diameter.

14. The attaching device of claim 13 wherein said gripping surface includes a planar surface.

15. The attaching device of claim 14 wherein said head includes an enlarged surface at a distal end thereof and a cylindrical disk at a proximal end thereof coaxial with said shank.

16. The attaching device of claim 15 wherein the retainer pin is a single integral piece formed of plastic.

\* \* \* \* \*